United States Patent
Chung et al.

(10) Patent No.: US 11,062,110 B2
(45) Date of Patent: Jul. 13, 2021

(54) FINGERPRINT DETECTION DEVICE, METHOD AND NON-TRANSITORY COMPUTER-READABLE MEDIUM FOR OPERATING THE SAME

(71) Applicant: NOVATEK Microelectronics Corp., Hsinchu (TW)

(72) Inventors: Jung-Chen Chung, Hsinchu County (TW); Chi-Ting Chen, Hsinchu (TW)

(73) Assignee: NOVATEK Microelectronics Corp., Hsinchu (TW)

( * ) Notice: Subject to any disclaimer, the term of this patent is extended or adjusted under 35 U.S.C. 154(b) by 52 days.

(21) Appl. No.: 16/713,013

(22) Filed: Dec. 13, 2019

(65) Prior Publication Data

US 2021/0182527 A1 Jun. 17, 2021

(51) Int. Cl.
*G06K 9/00* (2006.01)
(52) U.S. Cl.
CPC ..... *G06K 9/00013* (2013.01); *G06K 9/00087* (2013.01)

(58) Field of Classification Search
CPC ...................... G06K 9/00013; G06K 9/00087
See application file for complete search history.

(56) References Cited

U.S. PATENT DOCUMENTS

| 2018/0349669 A1* | 12/2018 | Kim | G06K 9/22 |
| 2019/0065814 A1* | 2/2019 | Morein | G06F 3/0412 |
| 2020/0028977 A1* | 1/2020 | Chang | H01L 27/14643 |

* cited by examiner

*Primary Examiner* — John B Strege
(74) *Attorney, Agent, or Firm* — CKC & Partners Co., LLC (57) ABSTRACT

A fingerprint detection device comprises a plurality of fingerprint sensing circuits and a processor. The plurality of fingerprint sensing circuits is corresponding to a plurality of sensing zones respectively. The processor is electrically coupled to the fingerprint sensing circuits through a shared transmission bus. The processor is configured to receive information of a touched area of each of the sensing zones, determine a transmission sequence according to the touched area of each of the sensing zones, and control the fingerprint sensing circuits to transmit sensing information of the corresponding sensing zones to the processor through the shared transmission bus according to the transmission sequence.

21 Claims, 10 Drawing Sheets

FINGERPRINT DETECTION DEVICE, METHOD AND NON-TRANSITORY COMPUTER-READABLE MEDIUM FOR OPERATING THE SAME

BACKGROUND

Technical Field

The present disclosure relates to an electronic device, a method and a non-transitory medium for operating the same. More specifically, the present disclosure relates to a device a method and a non-transitory medium for fingerprint detection.

Description of Related Art

In the prior art of under display fingerprint detection, a plurality of sensing units can be deployed to enlarge the area of detection. Usually, these sensing units are configured to send information to a processor of the mobile phone via the same transmission bus in a fixed sequence. This mechanism can reduce the efficiency of detection. Therefore, proper improvements are required.

SUMMARY

An aspect of the present disclosure relates to a fingerprint detection device. The fingerprint detection device comprises a plurality of fingerprint sensing circuits and a processor. The plurality of fingerprint sensing circuits is corresponding to a plurality of sensing zones respectively. The processor is electrically coupled to the fingerprint sensing circuits through a shared transmission bus. The processor is configured to receive information of a touched area of each of the sensing zones, determine a transmission sequence according to the touched area of each of the sensing zones; and control the fingerprint sensing circuits to transmit sensing information of the corresponding sensing zones to the processor through the shared transmission bus according to the transmission sequence.

Another aspect of the present disclosure relates to a fingerprint detection method. The fingerprint detection method comprises: receiving information of a touched area of each of a plurality of sensing zones, wherein each of the sensing zones is corresponding to at least one fingerprint sensing circuit that shares a shared transmission bus; determining a transmission sequence according to the touched area of each of the sensing zones; and controlling the at least one fingerprint sensing circuit to transmit sensing information of the corresponding sensing zones through the shared transmission bus according to the transmission sequence.

Still another aspect of the present disclosure relates to a non-transitory computer-readable medium including computer-executable instructions. When the computer-executable instructions are executed on a processor, following acts are performed: receiving information of a touched area of each of a plurality of sensing zones, wherein each of the sensing zones is corresponding to one of a plurality of fingerprint sensing circuits that shares a shared transmission bus; determining a transmission sequence according to the touched area of each of the sensing zones; and controlling the fingerprint sensing circuits to transmit sensing information of the corresponding sensing zones through the shared transmission bus according to the transmission sequence.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

In the following description and claims, the terms "first", "second", and the like are not intend to limit a specific order of the units being described.

In the following description and claims, the terms "coupled" and "connected", along with their derivatives, may be used. In particular embodiments, "connected" and "coupled" may be used to indicate that two or more elements are in direct physical or electrical contact with each other, or may also mean that two or more elements may be in indirect contact with each other. "Coupled" and "connected" may still be used to indicate that two or more elements cooperate or interact with each other.

As used herein, the terms "comprising," "including," "having," and the like are to be understood to be open-ended, i.e., to mean including but not limited to.

In the following description and claims, some of the directions "up", "down", "before", "after", "prior to", "behind" and the like can be considered as references along with the figures. The scope of present disclosure should not be limited thereto.

Figure 1A:
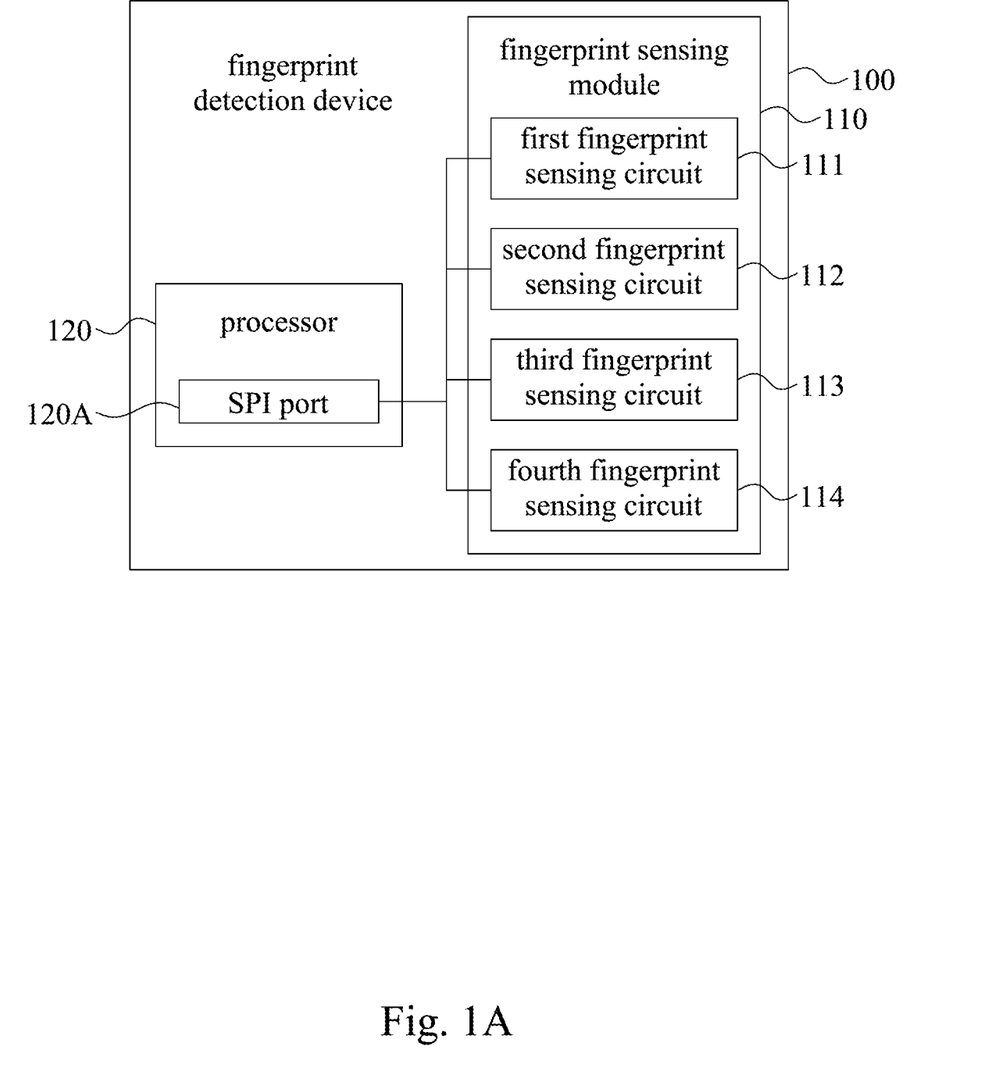
FIG. 1A is a schematic diagram showing a fingerprint detection device according to some embodiments of the present disclosure.

Reference is made to FIG. 1A. FIG. 1A is a schematic diagram showing a fingerprint detection device according to some embodiments of the present disclosure. As shown in FIG. 1A, in some embodiments, a fingerprint detection device 100 can include a fingerprint sensing module 110 and a processor 120. The fingerprint sensing module 110 and the processor 120 are electrically coupled with each other so that the processor 120 can control the fingerprint sensing module 110 to capture and identify at least one user's fingerprint.

In some embodiments, the fingerprint sensing module 110 can be a single optical sensing circuit or an integration of multiple optical sensing circuits. As shown FIG. 1A, in some embodiments, the fingerprint sensing module 110 can include a first fingerprint sensing circuit 111, a second fingerprint sensing circuit 112, a third fingerprint sensing circuit 113, and a fourth fingerprint sensing circuit 114. These fingerprint sensing circuits 111-114 may be arranged at any locations according design requirements, for example, to be adjacent to each other below a detection surface whereon the user's fingerprint can be detected. The detection surface, for example, can be a part of a surface of a display panel. According to design requirement, a diversity of optical structures (e.g. lens or waveguide gratings) can be arranged between the detection surface and the fingerprint sensing circuits 111-114.

It is noted that each of the fingerprint sensing circuits 111-114 can be implemented by an optical sensing unit (e.g. CCD or CMOS) according to some embodiments. While light passes optical structures (e.g. lens or waveguide gratings) above the fingerprint sensing circuits 111-114, the fingerprint sensing circuits 111-114 can capture optical information in its field of view. A field of view of the fingerprint sensing circuits 111-114 can determine a detection area of a single fingerprint sensing circuit. In this manner, of the plurality of the fingerprint sensing circuits 111-114 are able to capture optical information in a wider field of view.

In some embodiments, the fingerprint sensing circuits 111-114 are electrically coupled to the processor 120 via a shared transmission bus, such as a SPI (Serial Peripheral Interface) port 120A. In other words, the processor 120 can have this SPI port 120A as an input port to receive fingerprint images captured by the fingerprint sensing circuits 111-114. The implantation of a single input port (i.e. the SPI port) of the processor 120 can reduce complexity of transmission lines between the processor and the plurality of the fingerprint sensing circuits 111-114 and the number of input port of the processor.

However, it is noted that the foregoing embodiment is not intended to limit the scope of the present disclosure. In some embodiments, the fingerprint sensing module 110 can be implemented with a powerful optical sensing circuit having a relatively wide field of view so that the fingerprint sensing module 110 can cover a detection area that the fingerprint sensing circuits 111-114 of FIG. 1A are responsible for.

In some embodiments, the processor 120 can include, but not limited to, a single processor or an integration of multiple microprocessors, such as an application-specific integrated circuit (ASIC), etc. In some embodiments, the processor 120 can be associated with some memories (not shown). In this manner, the processor 120 can access specific computer readable instructions and execute the computer readable instructions in order to perform at least one application program to accomplish functions of the fingerprint detection device 100, which can be a method for capturing and identifying the user's fingerprint. For better understandings of the present disclosure, following paragraphs can introduce details of the application program performed by the processor 120.

In some embodiments, the memories can include, but not limited to, at least one of a flash memory, a hard disk drive (HDD), a solid-state drive (SSD), a dynamic random access memory (DRAM) and a static random access memory or a combination thereof. In some embodiments, as being a non-transitory computer readable medium, the memories can store the computer readable instructions that can be accessed by the processor 120.

Figure 1B:
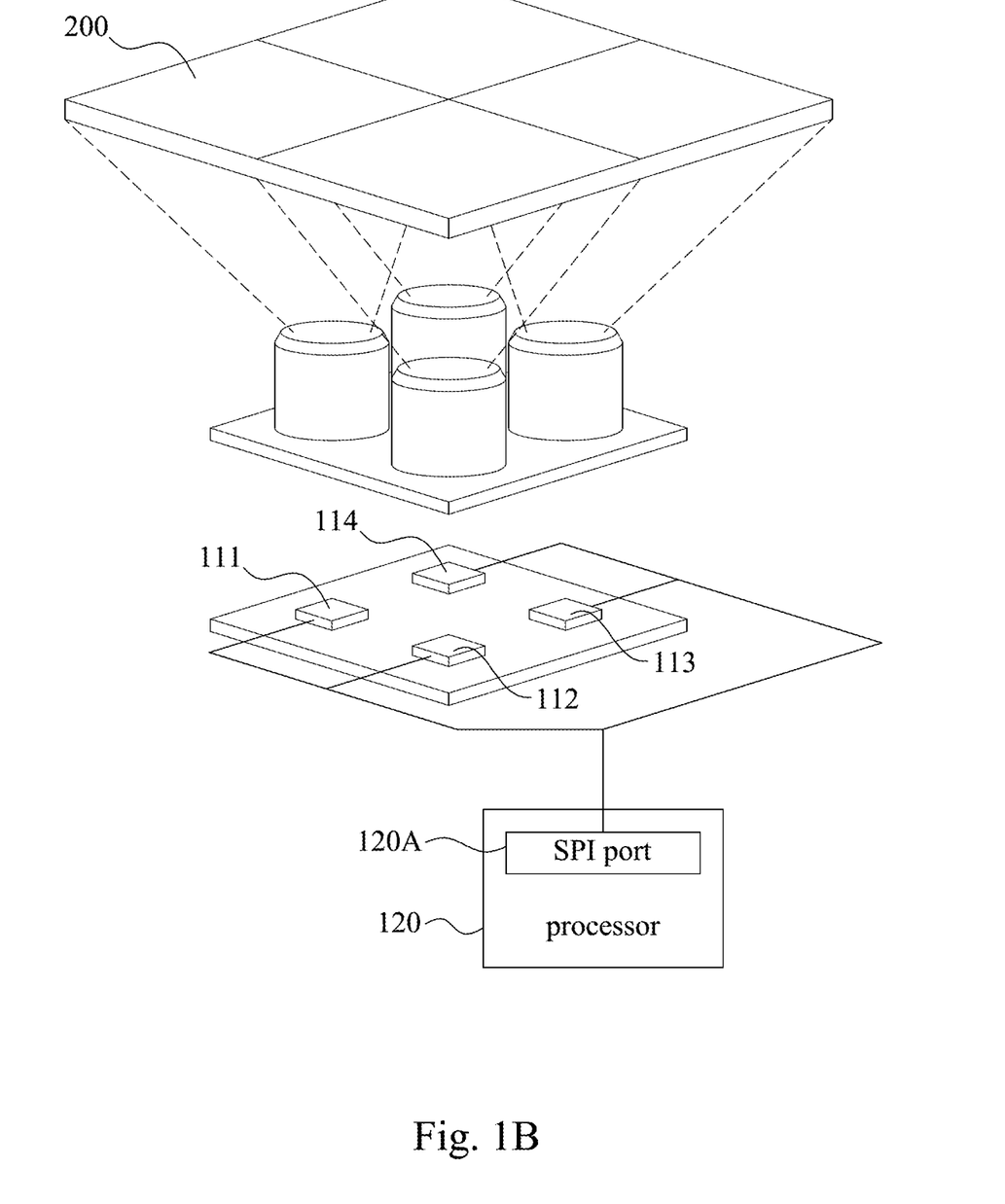
FIG. 1B is a schematic diagram showing a fingerprint detection device according to some embodiments of the present disclosure.

FIG. 1B is a schematic diagram showing a fingerprint detection device according to some embodiments of the present disclosure. A possible arrangement of the fingerprint sensing circuits 111-114 is shown in FIG. 1B. The embodiment of FIG. 1A can be referenced. The design shows that the fingerprint sensing circuits 111-114 are distributed on a top surface of a chip. Each of the fingerprint sensing circuits 111-114 is coupled to the processor 120 via the SPI port 120A. Above of the fingerprint sensing circuits 111-114, it is a lens module LM being aligned to the fingerprint sensing circuits 111-114. It is noted that both the lens module LM and the fingerprint sensing circuits 111-114 are settled under a part of a display 200. Based on this arrangement, the fingerprint sensing circuits 111-114 can capture light reflections penetrating the display 200 and the lens of the lens module LM.

Figure 1C:
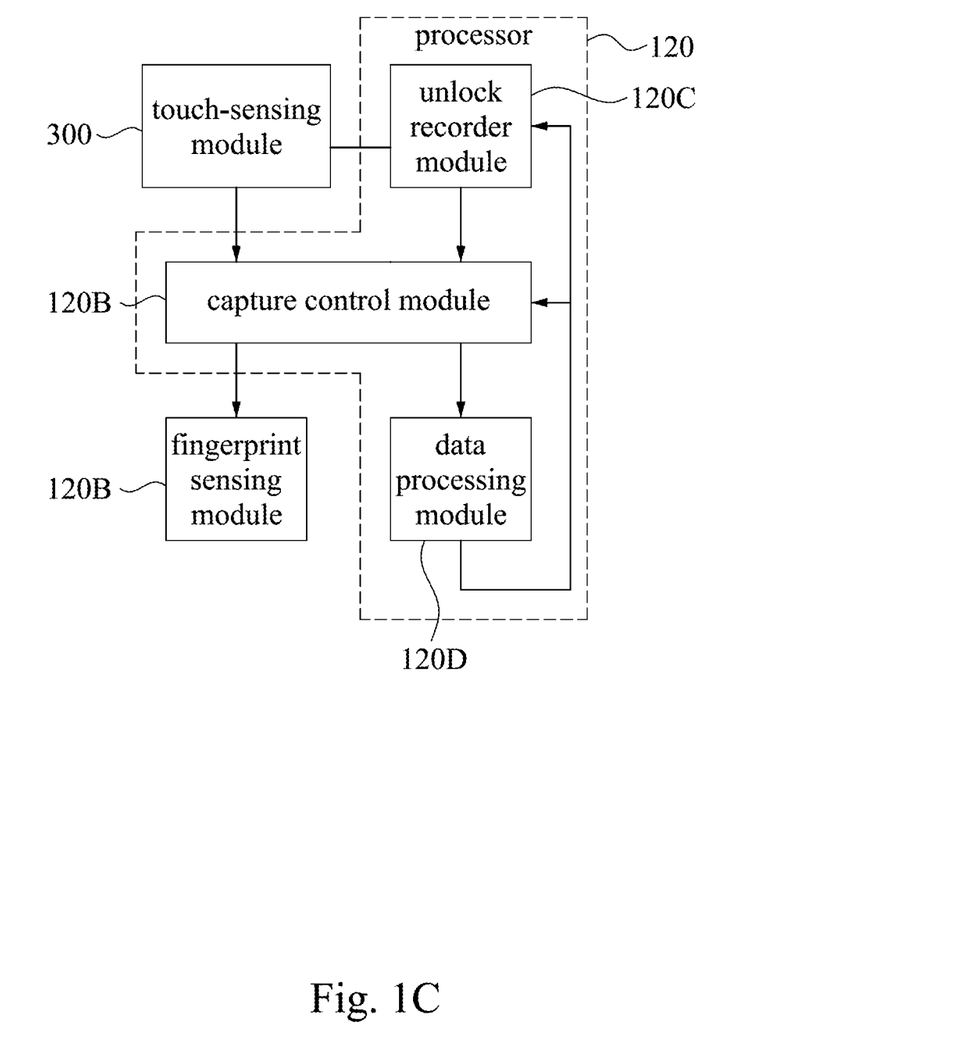
FIG. 1C is a schematic diagram showing a fingerprint detection device according to some embodiments of the present disclosure.

FIG. 1C is a schematic diagram showing a fingerprint detection device according to some embodiments of the present disclosure. FIG. 1C illustrates a possible arrangement of multiple modules (shown in blocks) of the fingerprint detection device. Likewise, the processor 120 is coupled to the fingerprint sensing module 120B (via the SPI port 120A of FIG. 1A and FIG. 1B) so that the processor 120 can receive images captured by the fingerprint sensing circuits 111-114 of the fingerprint sensing module 120B.

In this embodiment of FIG. 1C, the processor 120 is further coupled to a touch-sensing module 300. The touch-sensing module 300 can be a device including multiple touch-sensing electrodes on the display 200 for detecting user's finger contact. The finger contacts of the user can be used to determine fingerprint transmission sequences of the fingerprint sensing module 120B. The processor 120 includes an unlock recorder module 120C, a data processing module 120D and a capture control module 120E. The unlock recorder module 120C is configured to store fingerprint detection sequences that triggers successful unlocks. The data processing module 120D is configured to determine whether the captured images can trigger successful unlocks. The capture control module 120E is configured to control the transmission sequences of the fingerprint sensing module 120B. It is noed that the detail actions of these modules will be introduced further in the following embodiments.

Figure 2A:
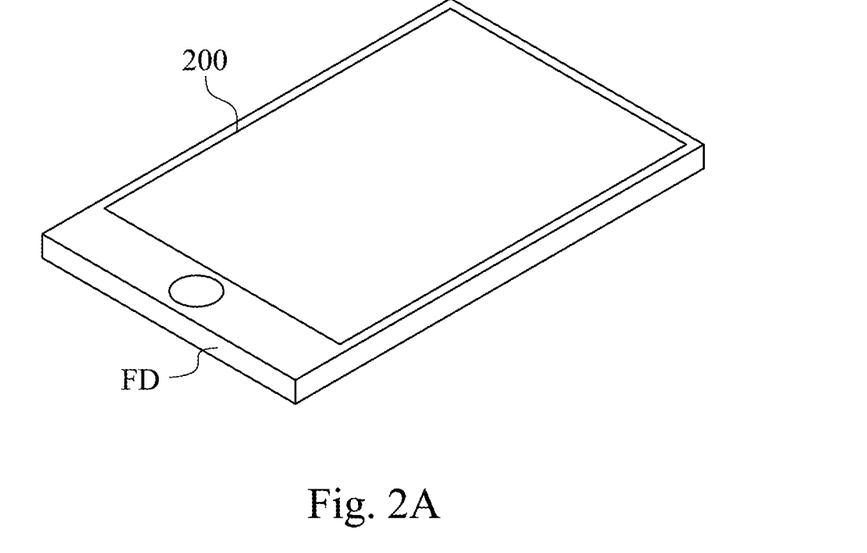
FIG. 2A is a schematic diagram showing a fingerprint detection device according to some embodiments of the present disclosure.
Figure 2B:
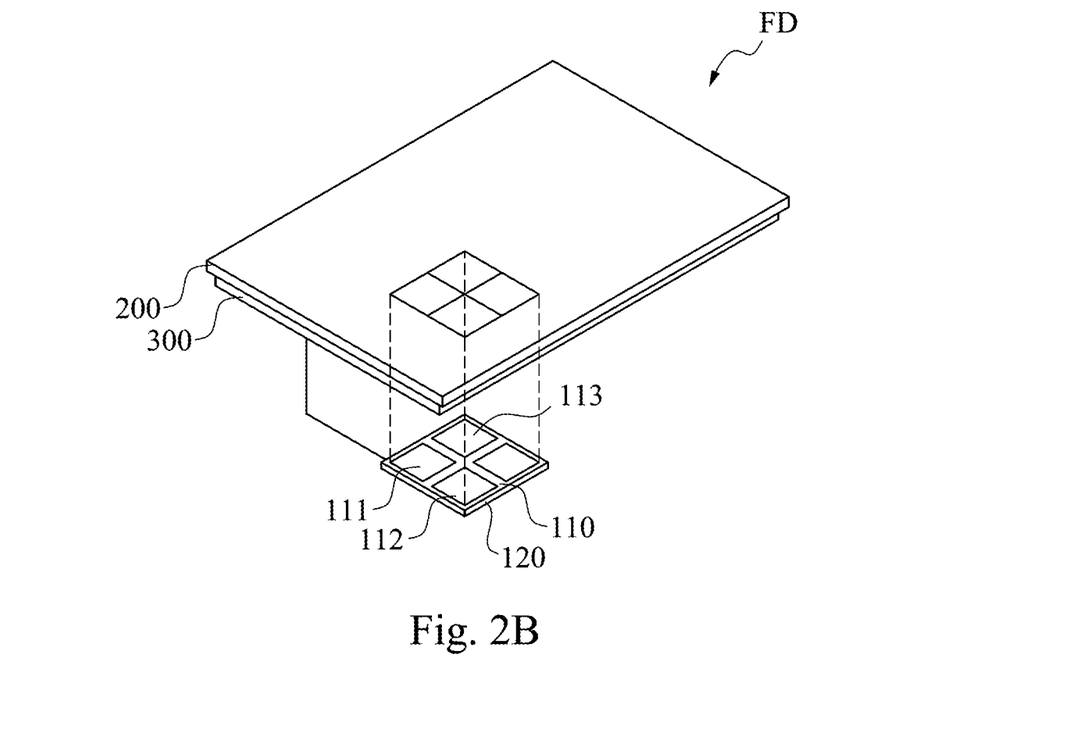
FIG. 2B is a schematic diagram showing a fingerprint detection device according to some embodiments of the present disclosure.

Reference is made to FIG. 2A-2B. FIG. 2A and FIG. 2B are schematic diagrams showing a fingerprint detection device according to some embodiments of the present disclosure. FIG. 2A shows the appearance of a fingerprint detection device FD. As shown in FIG. 2A, in some embodiments, a fingerprint detection device FD can be, but not limited to, a mobile phone including a display 200.

FIG. 2B shows, at least part of, the inside of the fingerprint detection device FD according to some embodiments. Reference can be made to FIG. 1B as well. As shown in FIG. 2B, in some embodiments, the fingerprint detection device FD further includes the touch-sensing module 300 (the same one as FIG. 1B). The touch-sensing module 300 can include a plurality of touch-sensing electrodes, such as common-mode electrodes, distributed underneath the display 200. As shown in FIG. 2B, the fingerprint detection device 100 of FIG. 1A are embedded into the fingerprint detection device FD. In such configuration, electronic signals of the touch-sensing electrodes can be transmitted to the processor 120 via at least one signal line.

It is understood that the above embodiment is not intended to limit the scope of the present disclosure. Any architecture of display panel capable of performing fingerprint sensing (or additionally touch sensing) can also be implemented. In alternative embodiments, the fingerprint detection device FD can include more parts, such as memories, IMUs, cameras, GPUs, or CPUs, etc. In this manner, the fingerprint detection device FD can perform functions more than fingerprint detections. In some embodiments, the processor 120 can be the CPU (or application processor) of the fingerprint detection device FD.

Figure 3A:
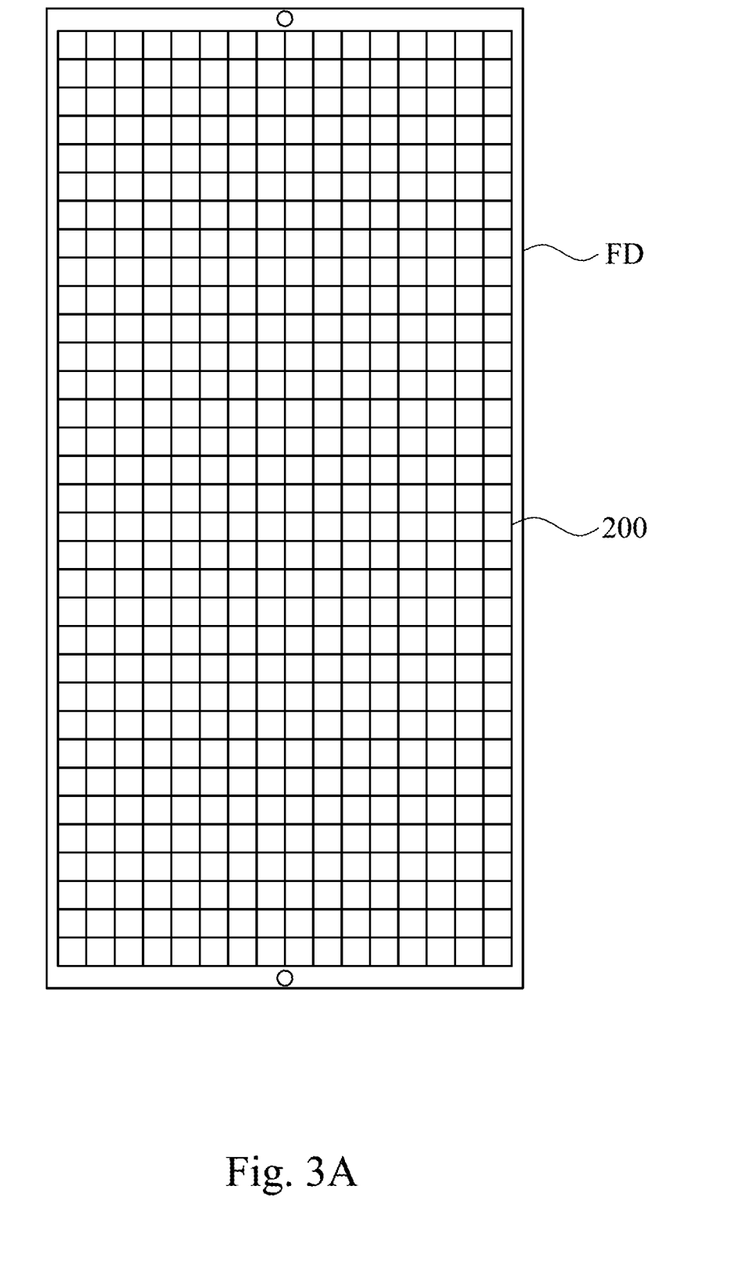
FIG. 3A is a schematic diagram showing a fingerprint detection device according to some embodiments of the present disclosure.

In some embodiments, the display 200 can be virtually divided into several sensing blocks. The division can be based on the distribution of touch sensing electrodes but the disclosure is not limited thereto. For better understandings, reference can be made to FIG. 3A, which is a schematic diagram showing a fingerprint detection device according to some embodiments of the present disclosure. As shown in FIG. 3A, in a front view of the display 200, the display 200 can be virtually divided into 512 (i.e. 16 in column and 32 in row) sensing blocks. In some embodiments, the touch-sensing electrodes of the touch-sensing module 300 can be used to detect touches of the user on the display 200. Once the user touches a sensing block of the display 200, the touch-sensing electrodes under this sensing block can transmit electronic signals to the processor 120. In this manner, the processor 120 can instruct the fingerprint sensing module to perform the corresponding region or zone of the display 200 that the user touched.

Figure 3B:
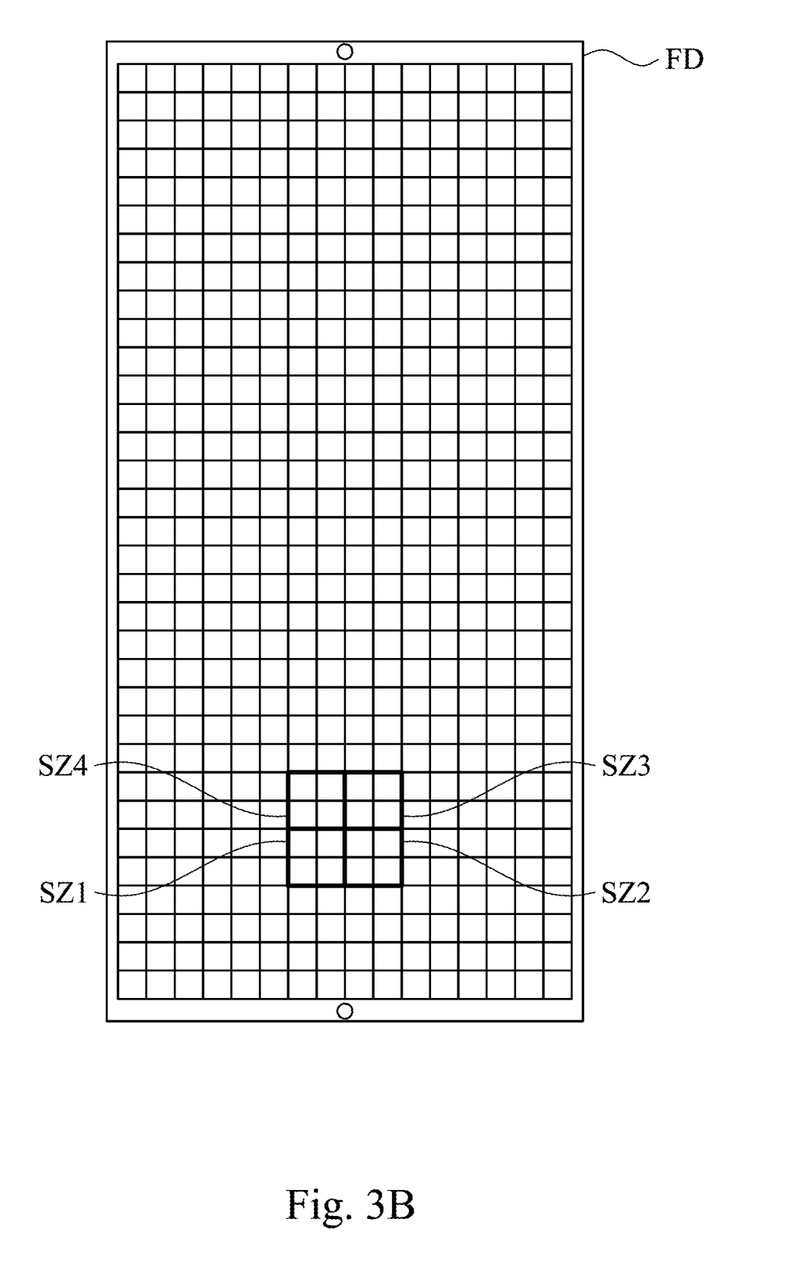
FIG. 3B is a schematic diagram showing a fingerprint detection device according to some embodiments of the present disclosure.

In some embodiments, a specific part of the display 200 can be used to detect and identify the user's fingerprint. For better understandings, reference can be made to FIG. 3B, which is another schematic diagram showing a fingerprint detection device according to some embodiments of the present disclosure. As shown in FIG. 3B, four sensing zones, which are a first sensing zone SZ1, a second sensing zone SZ2, a third sensing zone SZ3 and a fourth sensing zone SZ4, are substantially arranged in the middle of the display 200. Each of these sensing zones SZ1-SZ4 contains a plurality of sensing blocks (e.g., four blocks) of the display 200. However, it is understood that the numbers of the sensing zones and the positions of the sensing zones are not limited by this embodiment.

In some embodiments, the fingerprint sensing circuits 111-114 of FIG. 2B are disposed under these sensing zones SZ1-SZ4 in order to detect the user's fingerprint through the display 200. More specifically, in some embodiments, the first fingerprint sensing circuit 111 is arranged under the first sensing zone SZ1, the second fingerprint sensing circuit 112 is arranged under the second sensing zone SZ2, the third fingerprint sensing circuit 113 is arranged under the third sensing zone SZ3, and the fourth fingerprint sensing circuit 114 is arranged under the fourth sensing zone SZ4. Based on such configuration, the fingerprint sensing module 110 can detect the user's fingerprint while the user's finger lands on the sensing zones SZ1-SZ4 on the display 200.

Figure 4A:
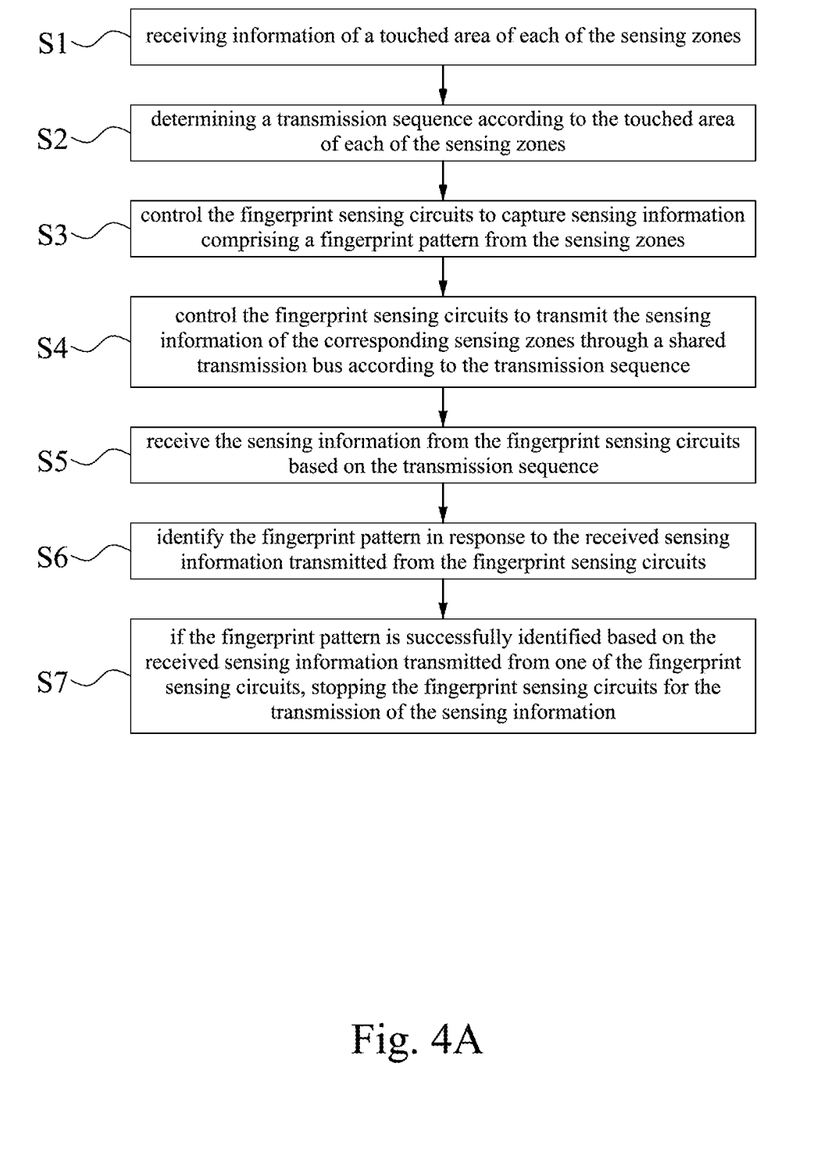
FIG. 4A is a flow chart showing a fingerprint detection method according to some embodiments of the present disclosure.

FIG. 4A is a flow chart showing a fingerprint detection method according to some embodiments of the present disclosure. In some embodiments, the fingerprint detection device 100 of FIG. 1 can perform a fingerprint detection method of FIG. 4A. Therefore, reference can be made to the embodiments of FIGS. 1, 2A-2B, and 3A-3B. For better understandings, the detail steps S1-S7 of the fingerprint detection method will be explained in the following paragraphs. It is noted that, in some embodiments, the processor 120 of the fingerprint detection device 100 is the unit performs the following steps S1-S7.

Step S1: receiving information of a touched area of each of the sensing zones.

Figure 5A:
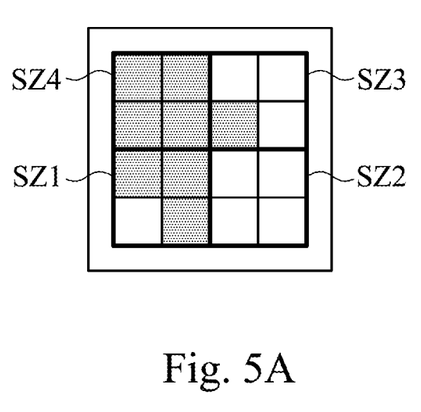
FIG. 5A is a demonstrational example about the touched areas of the sensing zones in FIG. 3B according to some embodiments of the present disclosure.

As mentioned, in some embodiments, the processor 120 can receive information of the touched area of each of the sensing zones SZ1-SZ4. Reference is further made to FIG. 5A. FIG. 5A is a demonstrational example about the touched areas of the sensing zones SZ1-SZ4 in FIG. 3B. In the example in FIG. 5A, when the user's finger (e.g., thumb) touches the sensing zones SZ1, SZ3 and SZ4, the touched areas of the sensing zones SZ1-SZ4 are shown in following Table 1:

TABLE 1

| | sensing zone | | | |
| --- | --- | --- | --- | --- |
| | SZ1 | SZ2 | SZ3 | SZ4 |
| touched area (blocks) | 3 | 0 | 1 | 4 |
| transmission sequence | $2^{nd}$ | $4^{th}$ | $3^{rd}$ | $1^{st}$ |

As shown in FIG. 5A and Table 1, the touched areas of the sensing zones SZ1-SZ4 reflect how the user contacts on the display 200. In the embodiments, the user contacts on three of four blocks in the sensing zone SZ1, one of four blocks in the sensing zone SZ3, and all of four blocks in the sensing zone SZ4.

However, it is understood that the above embodiment is not intended to limit the scope of the present disclosure. The way the processor 120 calculates the touched area of each sensing zone can be different subject to different hardware or software configurations. For example, if the touch-sensing electrodes of the touch-sensing module 300 can sense more details on the display 200, the touched area of each sensing zone can be calculated in a more accurate approach.

Step S2: determining a transmission sequence according to the touched area of each of the sensing zones.

As described for the embodiment of FIG. 1, in some embodiments, the fingerprint sensing circuits 111-114 are electrically coupled to the processor 120 via a shared transmission bus (e.g. a SPI bus). Therefore, to avoid conflicts, the processor 120 can control the fingerprint sensing circuits 111-114 to transmit sensing information thereon based on a specific transmission sequence.

In some embodiments, the transmission sequence is determined according to a sequential order of sizes of the touched areas within the sensing zones SZ1-SZ4. It is noted that a larger touched area within the sensing zones SZ1-SZ4 can provide more information for the fingerprint recognition. Therefore, data from the sensing zones SZ1-SZ4 with the larger touched area can be arranged to have a higher priority in the transmission sequence. When the touched areas of the sensing zones SZ1-SZ4 are received, the processor 120 can place a fingerprint sensing circuit corresponding to a sensing zone with a larger touched area at a higher priority in the transmission sequence, compared to another fingerprint sensing circuit corresponding to another sensing zone with a smaller touched area.

As shown in FIG. 5A and Table 1, the sensing zone SZ4 has the largest size of the touched area (4 blocks), such that the fourth fingerprint sensing circuit 114 transmits at the first order (prior to other three fingerprint sensing circuits 111-113). The sensing zone SZ1 has the second largest size of the touched area (3 blocks), such that the first fingerprint sensing circuit 111 transmits at the second order (prior to the second fingerprint sensing circuit 112 and the third fingerprint sensing circuit 113). The sensing zone SZ3 has the third largest size of the touched area (1 block), such that the third fingerprint sensing circuit 113 transmits at the third order (prior to the second fingerprint sensing circuit 112). The sensing zone SZ2 has the smallest size of the touched area (0 block), such that the second fingerprint sensing circuit 112 transmits at the latest order. In the embodiments shown in FIG. 5A, the transmission sequence can be determined as the fourth fingerprint sensing circuit 114 at first, then the first fingerprint sensing circuit 111, then the third fingerprint sensing circuit 113, and the second fingerprint sensing circuit 112 at last.

In this case, the processor 120 can fetch critical information (including more touched area) from the fourth fingerprint sensing circuit 114 faster than other fingerprint sensing circuits.

Figure 5B:
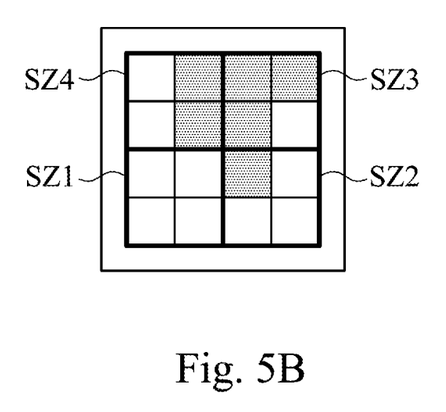
FIG. 5B is another demonstrational example about the touched areas of the sensing zones in FIG. 3B according to some embodiments of the present disclosure.

Reference is further made to FIG. 5B. FIG. 5B is another demonstrational example about the touched areas of the sensing zones SZ1-SZ4 in FIG. 3B. In the example in FIG. 5B, when the user's thumb touches the sensing zones SZ2, SZ3 and SZ4, the touched areas of the sensing zones SZ1-SZ4 are shown in following Table 2:

TABLE 2

|  | sensing zone | | | |
| --- | --- | --- | --- | --- |
|  | SZ1 | SZ2 | SZ3 | SZ4 |
| touched area (blocks) | 0 | 1 | 3 | 2 |
| transmission sequence | 4$^{th}$ | 3$^{rd}$ | 1$^{st}$ | 2$^{nd}$ |

In the embodiments shown in FIG. 5B, the transmission sequence can be determined as the third fingerprint sensing circuit 113 at first, then the second fingerprint sensing circuit 112, then the second fingerprint sensing circuit 112, and the first fingerprint sensing circuit 111 at last. In other words, the transmission sequence can be determined according to a sequential order of the sizes of the touched areas within the sensing zones SZ1-SZ4.

Figure 4B:
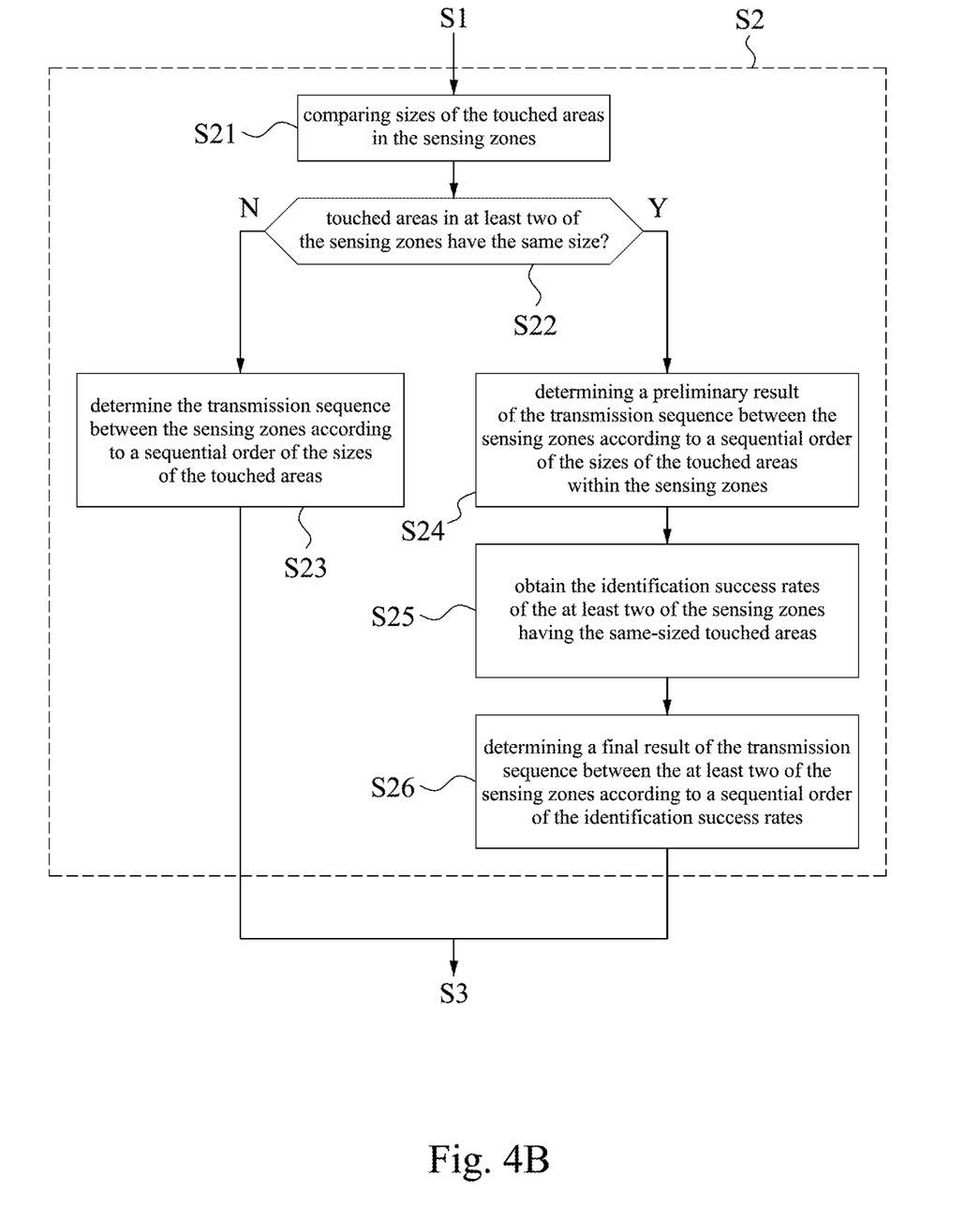
FIG. 4B is a flow diagram illustrating further steps in a step shown in FIG. 4A according to some embodiments of this disclosure.

In aforesaid embodiments shown in FIG. 5A and FIG. 5B, the touched areas of the sensing zones SZ1-SZ4 are different from each other, such that the transmission sequence is determined according to the sequential order of the sizes of the touched areas. However, the disclosure is not limited thereto. In some embodiments, the touched areas of any two or more of the sensing zones SZ1-SZ4 may have the same size. In such embodiments, more information such as identification success rates (but the disclosure is not limited thereto) can be considered to determine the transmission sequence. Reference is further made to FIG. 4B. FIG. 4B is a flow diagram illustrating further steps S21-S26 in the step S2 shown in FIG. 4A according to some embodiments of this disclosure.

As shown in FIG. 1 and FIG. 4B, step S21 is performed, by the processor 120, to compare the sizes of the touched areas in the sensing zones SZ1-SZ4. Step S22 is performed, by the processor 120, to determine whether there are touched area in at least two of the sensing zones SZ1-SZ4 have the same size or not. In response to that the touched area in the sensing zones SZ1-SZ4 are all different in size, for example, aforementioned embodiments in FIG. 5A along with Table 1 and embodiments in FIG. 5B along with Table 2, Step S23 is performed, by the processor 120, to determine the transmission sequence between the sensing zones SZ1-SZ4 according to the sequential order of the sizes of the touch areas. Detail of the Step S23 are explained in aforementioned embodiments in FIG. 5A along with Table 1 and in FIG. 5B along with Table 2, and not to be repeated here.

Figure 5C:
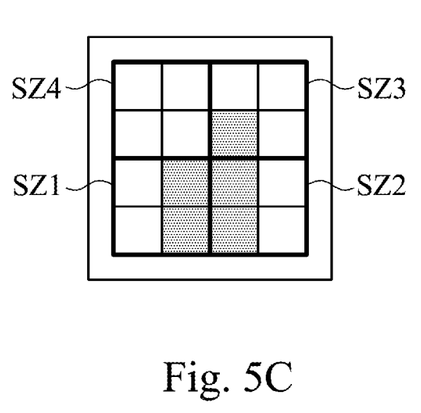
FIG. 5C is another demonstrational example about the touched areas of the sensing zones in FIG. 3B according to some embodiments of the present disclosure.

In response to that there are touched area in at least two of the sensing zones SZ1-SZ4 have the same size, steps S24-S26 are performed to determine the transmission sequence between the sensing zones SZ1-SZ4. Reference is further made to FIG. 5C. FIG. 5C is another demonstrational example about the touched areas of the sensing zones SZ1-SZ4 in FIG. 3B. In the example in FIG. 5C, when the user's thumb touches the sensing zones SZ1, SZ2 and SZ3, the touched areas of the sensing zones SZ1-SZ4 are shown in following Table 3:

TABLE 3

|  | sensing zone | | | |
| --- | --- | --- | --- | --- |
|  | SZ1 | SZ2 | SZ3 | SZ4 |
| touched area (blocks) | 2 | 2 | 1 | 0 |
| preliminary result of transmission sequence | 1$^{st}$ | 1$^{st}$ | 3$^{rd}$ | 4$^{th}$ |
| identification success rates (counts) | 11 | 14 | 17 | 4 |
| final result of transmission sequence | 2$^{nd}$ | 1$^{st}$ | 3$^{rd}$ | 4$^{th}$ |

As shown in FIG. 5C and Table 3, the sensing zones SZ1 and SZ2 have the same size of the touched areas (2 blocks), the sensing zone SZ3 has a smaller size of the touched area (1 block), and the sensing zone SZ4 has the smallest size of the touched area (0 blocks). Step S24 is performed, by the processor 120, to determine a preliminary result of the transmission sequence between the sensing zones SZ1-SZ4 according to the sequential order of the sizes of the touch areas. In the preliminary result of the transmission sequence, the first fingerprint sensing circuit 111 (corresponding to the sensing zone SZ1) and the second sensing circuit 112 (corresponding to the sensing zone SZ2) are both configured to transmit at the first order. In addition, the third fingerprint sensing circuit 113 (corresponding to the sensing zone SZ3) is configured to transmit at the third order, and the fourth fingerprint sensing circuit 114 (corresponding to the sensing zone SZ4) is configured to transmit at the fourth order.

In some embodiments, for these two of the sensing zones SZ1 and SZ2 having the same size of the touched areas, the processor 120 can determine the places of these sensing zones in the transmission sequence based on their identification success rates. In some embodiments, an identification success rate of a sensing zone can refer to a rate that this sensing zone can possibly lead to a successful result of fingerprint identification.

It is noted that FIG. 4B is illustrated only for explanation purpose. Any approaches that consider at least the sizes and identification rates of the sensing zones may be also used to arrange the transmission sequence. For example, the transmission sequence can be arranged according to mixed factors of the sensing zones, wherein the mixed factor for each sensing zone may be a weighted value of a size of the touched area of the sensing zone and an identification success rate of the sensing zone. In some embodiments, no matter whether there are at least two of the sensing zones have the same size, the size of the touch area of the sensing zone and the identification success rate of the sensing zone are both considered.

As shown in FIG. 4B, FIG. 5C and Table 3, Step S25 is performed, by the processor 120, to obtain the identification success rates of at least two of the sensing zones SZ1 and SZ2 have the same sized touch areas. In some embodiments, the processor 120 can obtain the identification success rates of all of the sensing zones SZ1-SZ4.

In some embodiments, to obtain the identification success rates, each time the sensing information from the sensing zones SZ1-SZ4 is transmitted to the processor 120, the processor 120 can establish a count for one of the sensing zones SZ1-SZ4 if that sensing zone triggers success fingerprint identification. For example, if the processor 120 has successfully identified the user's fingerprint using the sensing information of the first sensing zones SZ1, the current count of the first sensing zones SZ1 can be incremented by one. In this manner, a sensing zone that triggers more success fingerprint identifications can have a relatively larger count, which also represents a higher identification success rate. As shown in Table 3, it is assumed that the identification success rates (represented by counts) of the sensing zones SZ1-SZ4 are (11, 14, 17, 4).

However, it is understood that the foregoing embodiment is not intended to limit the scope of the present disclosure. The identification success rate of the sensing zones SZ1-SZ4 can be obtained in alternative approaches (e.g. derived from statistic results or any desired manner).

As shown in FIG. 4B, FIG. 5C and Table 3, Step S26 is performed, by the processor 120, to determine a final result of the transmission sequence between the at least two sensing zones (e.g., the sensing zones SZ1 and SZ2 in the embodiments shown in FIG. 5C) according to a sequential order of the identification success rates.

The embodiment of FIG. 5C and Table 3 are given with the following conditions: the touched areas of the sensing zones SZ1-SZ4 are (2, 2, 1, 0) and the identification success rates (represented by counts) of the sensing zones SZ1-SZ4 are (11, 14, 17, 4). In such case, the first sensing zone SZ1 and the second sensing zone SZ2 both have the largest touched area among all the sensing zones SZ1-SZ4. In addition, the second sensing zone SZ2 has a higher identification success rate than the first sensing zone SZ1. Therefore, the processor 120 can determine the second sensing zone SZ2 as being prior to the first sensing zone SZ1 in the final result of the transmission sequence. Next, since the touched area corresponding to the third sensing zone SZ3 is larger than the one corresponding to the fourth sensing zone SZ4, the processor 120 can determine the third sensing zone SZ3 as being prior to the fourth sensing zone SZ4 in the transmission sequence. In this case, the final result of the transmission sequence can be (SZ2, SZ1, SZ3, SZ4).

Figure 5D:
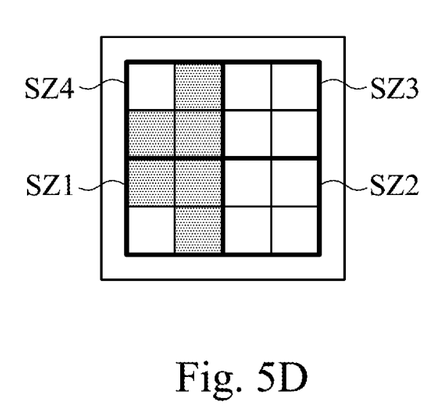
FIG. 5D is another demonstrational example about the touched areas of the sensing zones in FIG. 3B according to some embodiments of the present disclosure.

Reference is further made to FIG. 5D. FIG. 5D is another demonstrational example about the touched areas of the sensing zones SZ1-SZ4 in FIG. 3B. In the example in FIG. 5D, when the user's thumb touches the sensing zones SZ1 and SZ4, the touched areas of the sensing zones SZ1-SZ4 are shown in following Table 4:

TABLE 4

| | sensing zone | | | |
|---|---|---|---|---|
| | SZ1 | SZ2 | SZ3 | SZ4 |
| touched area (blocks) | 3 | 0 | 0 | 3 |
| preliminary result of transmission sequence | $1^{st}$ | $3^{rd}$ | $3^{rd}$ | $1^{st}$ |
| identification success rates (counts) | 11 | 14 | 17 | 4 |
| final result of transmission sequence | $1^{st}$ | $4^{th}$ | $3^{rd}$ | $2^{nd}$ |

As shown in FIG. 5D and Table 4, the sensing zones SZ1 and SZ4 have the same size of the touched areas (3 blocks), the sensing zone SZ2 and SZ3 has the same size of the touched areas (0 block). Step S24 is performed, by the processor 120, to determine a preliminary result of the transmission sequence between the sensing zones SZ1-SZ4 according to the sequential order of the sizes of the touch areas. The preliminary result of the transmission sequence, the first fingerprint sensing circuit 111 (corresponding to the sensing zone SZ1) and the fourth sensing circuit 114 (corresponding to the sensing zone SZ4) are both configured to transmit at the first order, and the second fingerprint sensing circuit 112 (corresponding to the sensing zone SZ2) and the third fingerprint sensing circuit 113 (corresponding to the sensing zone SZ3) are both configured to transmit at the third order.

As shown in FIG. 4B, FIG. 5D and Table 4, Step S25 is performed, by the processor 120, to obtain the identification success rates of the sensing zones SZ1 and SZ4 have the same sized touch areas, and the sensing zones SZ2 and SZ3 have the same sized touch areas. In some embodiments, the processor 120 can obtain the identification success rates of all of the sensing zones SZ1-SZ4.

As shown in FIG. 4B, FIG. 5D and Table 4, Step S26 is performed, by the processor 120, to determine a final result of the transmission sequence between the at least two sensing zones (e.g., between the sensing zones SZ1 and SZ4, and between the sensing zones SZ2 and SZ3 in the embodiments shown in FIG. 5D) according to a sequential order of the identification success rates.

As shown in the embodiment of FIG. 5D and Table 4, processor 120 can determine the first sensing zone SZ1 as being prior to the fourth sensing zone SZ4 in the transmission sequence, and the third sensing zone SZ3 as being prior to the second sensing zone SZ2 in the transmission sequence. In this case, the final result of the transmission sequence can be (SZ1, SZ4, SZ3, SZ2).

Figure 4C:
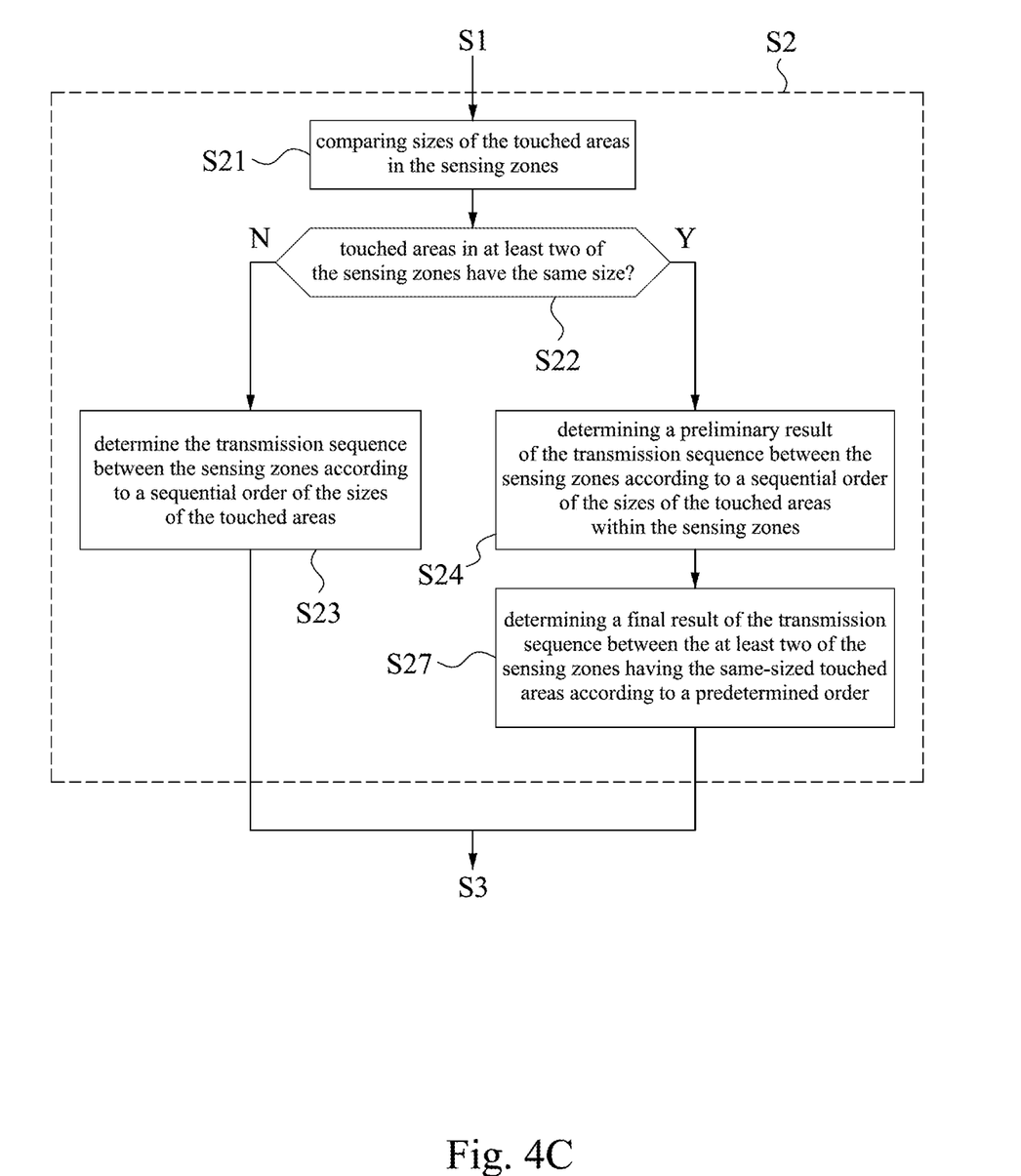
FIG. 4C is a flow diagram illustrating further steps in a step shown in FIG. 4A according to some embodiments of this disclosure.

In aforesaid embodiments shown in FIG. 4B, the transmission sequence between the at least two sensing zones have the same sized touch areas can be determined according to the identification success rates. However, the disclosure is not limited thereto. Reference is further made to FIG. 4C. FIG. 4C is a flow diagram illustrating further steps S21-S24 and S27 in the step S2 shown in FIG. 4A according to some embodiments of this disclosure. The steps S21-S24 shown in FIG. 4C are similar to the steps S21-S24 in the embodiments shown in FIG. 4B, and not to be repeated here.

As shown in FIG. 4C, after the step S24, the processor 120 performs step S27 to determine a final result of the transmission sequence between the at least two sensing zones have the same sized touch areas according to a predetermined order. The predetermined order can be a predefined sequential order such as SZ1 at first, SZ2 at second, SZ3 at third and SZ4 at fourth.

According to the demonstrational example in FIG. 5D, the final result of the transmission sequence determined by the step S27 in FIG. 4C is shown in following Table 5:

TABLE 5

|  | sensing zone | | | |
| --- | --- | --- | --- | --- |
|  | SZ1 | SZ2 | SZ3 | SZ4 |
| touched area (blocks) | 3 | 0 | 0 | 3 |
| preliminary result of transmission sequence | 1$^{st}$ | 3$^{rd}$ | 3$^{rd}$ | 1$^{st}$ |
| predetermined order | 1$^{st}$ | 2$^{nd}$ | 3$^{rd}$ | 4$^{th}$ |
| final result of transmission sequence | 1$^{st}$ | 3$^{rd}$ | 4$^{th}$ | 2$^{nd}$ |

In the transmission sequence determined by the step S27 corresponding to the demonstrational example in FIG. 5D and Table 4, the processor 120 can determine the first sensing zone SZ1 as being prior to the fourth sensing zone SZ4 in the transmission sequence, and the third sensing zone SZ2 as being prior to the second sensing zone SZ3 in the transmission sequence. In this case, the final result of the transmission sequence can be (SZ1, SZ4, SZ2, SZ3).

Nevertheless, above embodiments are not intended to limit the scope of the present disclosure. In some cases, if the touched area of a sensing zone is 0 (i.e. the sensing zone is not touched), the processor 120 can ignore such sensing zone when determining the transmission sequence. The mechanism can further improve the efficiency of transmission.

Step S3: control the fingerprint sensing circuits to capture sensing information comprising a fingerprint pattern from the sensing zones.

In some embodiments, when the user's finger touches the sensing zones SZ1-SZ4 of the display 200, optical information being captured by the fingerprint sensing circuits 111-114 can contain sufficient information for the identification of the user's fingerprint. Therefore, the order of the step S2-S3 is not limited by the embodiments above, whether the transmission sequence is determined or not, the processor 120 can control the fingerprint sensing circuit 100 to capture sensing information from the sensing zones SZ1-SZ4 when the user's finger is on the sensing zones SZ1-SZ4. It is noted that, in some embodiments, the processor 120 can control the fingerprint sensing circuits 111-114 to capture the user's fingerprint simultaneously (i.e. at the same time).

Step S4: control the fingerprint sensing circuits to transmit the sensing information of the corresponding sensing zones through a shared transmission bus according to the transmission sequence.

In some embodiments, when the processor 120 determines the transmission sequence and control the fingerprint sensing circuits 111-114 to capture the sensing information from the sensing zones SZ1-SZ4, the processor 120 can control the fingerprint sensing circuits 111-114 to start the transmission of the sensing information according to the transmission sequence.

In foregoing embodiments, if the processor 120 determines the transmission sequence as shown in Table 1, the processor 120 can send a command to each of the fingerprint sensing circuits 111-114 for the sensing information based on the transmission sequence. In this case, the processor 120 can send commands to the fingerprint sensing circuits 111-114 in the following order: the fourth fingerprint sensing circuit 114 is the first; the first fingerprint sensing circuit 111 is the next; the third fingerprint sensing circuit 113 is the third; and the second fingerprint sensing circuit 112 is the last.

In foregoing embodiments, if the processor 120 determines the transmission sequence as shown in Table 2, the processor 120 can send a command to each of the fingerprint sensing circuits 111-114 for the sensing information based on the transmission sequence. In this case, the processor 120 can send commands to the fingerprint sensing circuits 111-114 in the following order: the third fingerprint sensing circuit 113 is the first; the fourth fingerprint sensing circuit 114 is the next; the second fingerprint sensing circuit 112 is the third; and the first fingerprint sensing circuit 111 is the last.

In foregoing embodiments, if the processor 120 determines the transmission sequence as shown in Table 3, the processor 120 can send command to each of the fingerprint sensing circuits 111-114 for the sensing information based on the transmission sequence. In this case, the processor 120 can send command to the fingerprint sensing circuits 111-114 in the following order: the second fingerprint sensing circuit 112 is the first; the first fingerprint sensing circuit 111 is the next; the third fingerprint sensing circuit 113 is the third; and the fourth fingerprint sensing circuit 114 is the last.

In foregoing embodiments, if the processor 120 determines the transmission sequence as shown in Table 4, the processor 120 can send a command to each of the fingerprint sensing circuits 111-114 for the sensing information based on the transmission sequence. In this case, the processor 120 can send commands to the fingerprint sensing circuits 111-114 in the following order: the first fingerprint sensing circuit 111 is the first; the fourth fingerprint sensing circuit 114 is the next; the third fingerprint sensing circuit 113 is the third; and the second fingerprint sensing circuit 112 is the last.

Step S5: receive the sensing information from the fingerprint sensing circuits based on the transmission sequence.

In some embodiment, since the fingerprint sensing circuits 111-114 are controlled to send out the sensing information based on the transmission sequence, the sensing information of the fingerprint sensing circuits 111-114 being received should be in the same order. Therefore, the processor 120 can receive the sensing information from the fingerprint sensing circuits 111-114 in the order of: the second fingerprint sensing circuit 112; the first fingerprint sensing circuit 111; the third fingerprint sensing circuit 113; and the fourth fingerprint sensing circuit 114.

Step S6: identify the fingerprint pattern in response to the received sensing information transmitted from the fingerprint sensing circuits.

In some embodiment, each time the processor 120 receives the sensing information from a single fingerprint sensing circuit, the processor 120 can input the sensing information to a fingerprint identification application. As mentioned, usually, at least one of the fingerprint sensing circuits 111-114 can capture sufficient information from the sensing zones SZ1-SZ4 for identifying the user's fingerprint.

Steps S7: if the fingerprint pattern is successfully identified based on the received sensing information transmitted from one of the fingerprint sensing circuits, stopping the fingerprint sensing circuits for the transmission of the sensing information.

In some embodiments, each time the sensing information from a single fingerprint sensing circuit is inputted into the fingerprint identification application, the fingerprint identification application can try to identify the user's fingerprint pattern based on the received sensing information. Once the fingerprint identification application executed by the processor 120 has successfully identified the user's fingerprint pattern based on the received sensing information from any of the fingerprint sensing circuits 111-114, the processor 120 can transmit a command to the rest of the fingerprint sensing circuits 111-114 to stop the transmission.

More specifically, for example, in a case shown in Table 3 with the transmission sequence (SZ2, SZ1, SZ3, SZ4), if the fingerprint identification application has successfully identified the user's fingerprint pattern based on the received sensing information from the first fingerprint sensing circuit 111, the processor 120 can transmit commands to the fingerprint sensing circuits 113-114 to stop them for the transmission of the sensing information. It is to say, in the worst-case scenario, the processor 120 can have the fingerprint identification successful after all the sensing information from the fingerprint sensing circuits 111-114 are received. However, in the best-case scenario, the processor 120 can have the fingerprint identification successful when the sensing information from the second fingerprint sensing circuit 112 is received.

It is noted that, if the sensing information from the second fingerprint sensing unit 112 triggers the fingerprint identification to be successful, the processor 120 can increment the count corresponding to the first sensing zones SZ1 by one. In this manner, the identification success rate of each sensing zones can be optimized while the user keep using the fingerprint detection device FD. According to this mechanism, the identification success rate of the sensing zones can reflect the user habit. Therefore, the efficiency of the fingerprint detection device 100 can grow over time.

It is understood that the method of the present disclosure can still be applicable in different hardware configurations. For example, if the fingerprint sensing module 110 is implemented by a single sensing circuit instead of the fingerprint sensing circuits 111-114, the processor 120 can still control the single sensing circuit to capture sensing information and make the single sensing circuit to transmit the sensing information corresponding to the sensing zones SZ1-SZ4 based on the arranged transmission sequence.

In foregoing embodiments, the fingerprint detection device 100 and the fingerprint detection device FD have multiple functional blocks or modules. As will be appreciated by persons skilled in the art, in some embodiments, these functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. However, the scope of present disclosure is not limited thereto.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A fingerprint detection device, comprising:
a plurality of fingerprint sensing circuits, corresponding to a plurality of sensing zones respectively; and
a processor, electrically coupled to the fingerprint sensing circuits through a shared transmission bus, wherein the processor is configured to
receive information of a touched area of each of the sensing zones;
determine a transmission sequence according to the touched area of each of the sensing zones; and
control the fingerprint sensing circuits to transmit sensing information of the corresponding sensing zones to the processor through the shared transmission bus according to the transmission sequence.

2. The fingerprint detection device of claim 1, wherein the processor is further configured to:
control the fingerprint sensing circuits to simultaneously capture the sensing information comprising a fingerprint pattern from the sensing zones.

3. The fingerprint detection device of claim 2, wherein the processor is further configured to:
receive the sensing information from at least one of the fingerprint sensing circuits based on the transmission sequence; and
identify the fingerprint pattern in response to the received sensing information transmitted from the at least one of the fingerprint sensing circuits.

4. The fingerprint detection device of claim 3, wherein the fingerprint sensing circuits comprise a first fingerprint sensing circuit and a second fingerprint sensing circuit, and
if the processor successfully identifies the fingerprint pattern based on the received sensing information transmitted from the first fingerprint sensing circuit, the processor is further configured to stop the second fingerprint sensing circuit for transmitting the sensing information to the processor, wherein the first fingerprint sensing circuit is prior to the second fingerprint sensing circuit in the transmission sequence.

5. The fingerprint detection device of claim 1, wherein the sensing zones comprise a first sensing zone corresponding to a first fingerprint sensing circuit of the fingerprint sensing circuits and a second sensing zone corresponding to a second fingerprint sensing circuit of the fingerprint sensing circuits, and if the touched area of the first sensing zone is larger than the touched area of the second sensing zone, the processor is configured to determine the first fingerprint sensing circuit being prior to the second fingerprint sensing circuit in the transmission sequence.

6. The fingerprint detection device of claim 1, wherein the processor is further configured to:

establish a count corresponding to one of the sensing zones if the sensing information of the one of sensing zone being successfully identified as a fingerprint pattern.

7. The fingerprint detection device of claim 1, wherein the processor is configured to determine the transmission sequence further based on an identification success rate of at least one of the sensing zones.

8. The fingerprint detection device of claim 7, wherein the sensing zones comprises a first sensing zone and a second sensing zone, and the processor is further configured to:
if the touched area of the first sensing zone is identical to the touched area of the second sensing zone, determine the transmission sequence further according to the identification rate success rate of the first sensing zone and the identification rate success rate of the second sensing zone.

9. The fingerprint detection device of claim 8, wherein the fingerprint sensing circuits comprises a first fingerprint sensing circuit corresponding to the first sensing zone and a second fingerprint sensing circuit corresponding to the second sensing zone, and if the identification success rate of the first sensing zone is larger than the if the identification success rate of the second sensing zone, the processor is configured to determine the first fingerprint sensing circuit being prior to the second fingerprint sensing circuit in the transmission sequence.

10. The fingerprint detection device of claim 1, wherein the processor comprises a shared port and the fingerprint sensors are electrically coupled to the processor thorough the shared transmission bus via the shared port.

11. A fingerprint detection method, comprising:
receiving information of a touched area of each of a plurality of sensing zones, wherein each of the sensing zones is corresponding to at least one fingerprint sensing circuit that shares a shared transmission bus;
determining a transmission sequence according to the touched area of each of the sensing zones; and
controlling the at least one fingerprint sensing circuit to transmit sensing information of the corresponding sensing zones through the shared transmission bus according to the transmission sequence.

12. The fingerprint detection method of claim 11, further comprising:
controlling the at least one fingerprint sensing circuit to simultaneously capture the sensing information comprising a fingerprint pattern from the sensing zones.

13. The fingerprint detection method of claim 12, further comprising:
receiving the sensing information from the at least one fingerprint sensing circuit based on the transmission sequence; and
identifying the fingerprint pattern in response to the received sensing information transmitted from the at least one fingerprint sensing circuit.

14. The fingerprint detection method of claim 13, further comprising:
if the fingerprint pattern is successfully identified based on the received sensing information transmitted from a first fingerprint sensing circuit of the fingerprint sensing circuits, stopping a second fingerprint sensing circuit of the fingerprint sensing circuits for transmitting the sensing information, wherein the first fingerprint sensing circuit is arranged prior to the second fingerprint sensing circuit in the transmission sequence.

15. The fingerprint detection method of claim 11, wherein the sensing zones comprise a first sensing zone corresponding to a first fingerprint sensing circuit of the fingerprint sensing circuits and a second sensing zone corresponding to a second fingerprint sensing circuit of the fingerprint sensing circuits, and the fingerprint detection method further comprising:
if the touched area of the first sensing zone is larger than the touched area of the second sensing zone, determining the first fingerprint sensing circuit being prior to the second fingerprint sensing circuit in the transmission sequence.

16. The fingerprint detection method of claim 11, further comprising:
establish a count corresponding to one of the sensing zones if the sensing information of the one of sensing zone being successfully identified as a fingerprint pattern.

17. The fingerprint detection method of claim 11, wherein determining the transmission sequence further comprising determining the transmission sequence based on an identification success rate of at least one of the sensing zones.

18. The fingerprint detection method of claim 17, wherein the sensing zones comprises a first sensing zone and a second sensing zone, and the fingerprint detection method further comprising:
if the touched area of the first sensing zone is identical to the touched area of the second sensing zone, determining the transmission sequence further according to the identification rate success rate of the first sensing zone and the identification rate success rate of the second sensing zone.

19. The fingerprint detection method of claim 16, further comprising:
if the identification success rate of the first sensing zone is larger than the if the identification success rate of the second sensing zone, determining the at least one fingerprint sensing circuit to transmit the sensing information of the first sensing zone prior to the sensing information of the second sensing zone in the transmission sequence.

20. A non-transitory computer-readable medium including computer-executable instructions, which when executed on a processor, perform the acts comprising:
receiving information of a touched area of each of a plurality of sensing zones, wherein each of the sensing zones is corresponding to one of a plurality of fingerprint sensing circuits that shares a shared transmission bus;
determining a transmission sequence according to the touched area of each of the sensing zones; and
controlling the fingerprint sensing circuits to transmit sensing information of the corresponding sensing zones through the shared transmission bus according to the transmission sequence.

21. A fingerprint detection device, comprising:
a plurality of touch-sensing electrodes, spread in a plurality of sensing zones to sense a touched area of each of the sensing zones;
at least one fingerprint sensing circuit coupled to a shared transmission bus, wherein the at least one fingerprint sensing circuit is corresponding to the sensing zones; and
a processor, electrically coupled to the touch-sensing electrodes and the at least one fingerprint sensing circuit, wherein the processor is configured to:
receive information of the touched area of each of the sensing zones;

determine a transmission sequence according to the touched area of each of the sensing zones; and control the at least one fingerprint sensing circuit to transmit sensing information of the corresponding sensing zones to the processor through the shared transmission bus according to the transmission sequence.

\* \* \* \* \*